United States Patent
Deng et al.

(10) Patent No.: US 11,412,446 B2
(45) Date of Patent: Aug. 9, 2022

(54) NETWORK ENERGY EFFICIENCY

(71) Applicant: IDAC Holdings, Inc., Wilmington, DE (US)

(72) Inventors: Tao Deng, Roslyn, NY (US); Paul Marinier, Brossard (CA); Marian Rudolf, Montreal (CA); J. Patrick Tooher, Montreal (CA); Benoit Pelletier, Roxboro (CA)

(73) Assignee: IDAC Holdings, Inc., Wilmington, DE (US)

( * ) Notice: Subject to any disclaimer, the term of this patent is extended or adjusted under 35 U.S.C. 154(b) by 46 days.

(21) Appl. No.: 16/324,327

(22) PCT Filed: Aug. 10, 2017

(86) PCT No.: PCT/US2017/046318
§ 371 (c)(1),
(2) Date: Feb. 8, 2019

(87) PCT Pub. No.: WO2018/031788
PCT Pub. Date: Feb. 15, 2018

(65) Prior Publication Data
US 2019/0182767 A1 Jun. 13, 2019

Related U.S. Application Data

(60) Provisional application No. 62/416,423, filed on Nov. 2, 2016, provisional application No. 62/373,048, filed on Aug. 10, 2016.

(51) Int. Cl.
*H04W 52/02* (2009.01)
*H04B 17/318* (2015.01)
(Continued)

(52) U.S. Cl.
CPC ...... *H04W 52/0206* (2013.01); *H04B 7/0617* (2013.01); *H04B 17/318* (2015.01);
(Continued)

(58) Field of Classification Search
None
See application file for complete search history.

(56) References Cited

U.S. PATENT DOCUMENTS 9,203,566 B2 12/2015 Terry et al.
2012/0184311 A1* 7/2012 Yamamoto .......... H04W 56/002
455/502

(Continued)

FOREIGN PATENT DOCUMENTS

| CN | 104219774 A | 12/2014 |
|----|-------------|---------|
| CN | 105027480 A | 11/2015 |

(Continued)

OTHER PUBLICATIONS

3rd Generation Partnership Project (3GPP), TR 38.913 V0.3.0, "Technical Specification Group Radio Access Network; Study on Scenarios and Requirements for Next Generation Access Technologies; (Release 14)", Mar. 2016, 30 pages.

(Continued)

*Primary Examiner* — Chi H Pham
*Assistant Examiner* — Raul Rivas
(74) *Attorney, Agent, or Firm* — Condon Roccia Koptiw LLP

(57) ABSTRACT

Systems, methods, and instrumentalities are disclosed for a wireless transmit/receive unit (WTRU) receiving a first set of one or more initial access signals from a Transmission/Reception Point (TRP), wherein the first set of one or more initial access signals indicates that the TRP is in a dormant state, sending an echo signal to the TRP, wherein one or more transmission parameters of the echo signal are derived (Continued)

from the first set of one or more initial access signals received from the TRP, monitoring for a second set of one or more initial access signals from the TRP after transmitting the echo signal, and receiving the second set of one or more initial access signals, the second set of initial access signals comprising information associated with accessing the TRP. Sets of one or more initial access signals may be received from a plurality of TRPs in an area. The second set of one or more initial access signals may be received from a TRP that is closest to, or has a strongest signal strength for transmitting to, the WTRU.

20 Claims, 10 Drawing Sheets

(51) Int. Cl.
H04B 7/06 (2006.01)
H04W 24/08 (2009.01)
H04B 7/0413 (2017.01)
(52) U.S. Cl.
CPC ........... *H04W 24/08* (2013.01); *H04B 7/0413* (2013.01); *Y02D 30/70* (2020.08)

(56) References Cited

U.S. PATENT DOCUMENTS

| | | | | |
|---|---|---|---|---|
| 2013/0083714 | A1* | 4/2013 | Joko | H04W 52/0206 370/311 |
| 2014/0302855 | A1* | 10/2014 | Nory | H04W 52/0206 455/437 |
| 2015/0063311 | A1 | 3/2015 | Chindapol et al. | |
| 2015/0282051 | A1 | 10/2015 | Niu et al. | |
| 2016/0007406 | A1* | 1/2016 | Yi | H04W 24/02 370/252 |
| 2016/0157267 | A1 | 6/2016 | Frenne et al. | |

FOREIGN PATENT DOCUMENTS

CN 105306186 A 2/2016
CN 105340334 A 2/2016

OTHER PUBLICATIONS

3rd Generation Partnership Project (3GPP), R1-1609264, "Issues on NR Initial Access", LG Electronics, 3GPP TSG RAN WG1 Meeting #86bis, Lisbon, Portugal, Oct. 10-14, 2016, 4 pages.

\* cited by examiner

NETWORK ENERGY EFFICIENCY

CROSS REFERENCE TO RELATED APPLICATIONS

This application is the National Stage entry under 35 U.S.C. § 371 of Patent Cooperation Treaty Application PCT/US2017/046318, filed Aug. 10, 2017, which claims priority to and the benefit of U.S. Provisional Application Ser. No. 62/373,0481, filed Aug. 10, 2016 and U.S. Provisional Application Ser. No. 62/416,423 filed Nov. 2, 2016, which is hereby incorporated by reference herein.

BACKGROUND

Mobile communications continue to evolve. A fifth generation may be referred to as 5G, New Radio, or NR. 5G New Radio (NR) may support usage scenarios beyond mobile broadband, such as massive machine type communication (mMTC), ultra-reliable and low latency communication (URLLC), and enhanced mobile broadband (eMBB). 5G NR may support higher data rates and increased spectrum efficiency.

Radio access network (RAN) energy consumption may be minimized while increasing area traffic capacity and/or network energy efficiency. Energy consumption by network equipment may be a function based on many factors, e.g., such as maximum transmit power, antenna configuration and operating bandwidth. Energy consumption may be reduced, for example, by turning off transceivers (or a module thereof) when no traffic is being served by the equipment and/or when no terminal needs to access the network. Network equipment (e.g., transmission/reception point) covering small areas may be turned off more frequently. Equipment covering a small area may be part of a dense deployment. The percentage of time when such equipment may be unused may be relatively high.

SUMMARY

Systems, methods, and instrumentalities are disclosed for a wireless transmit/receive unit (WTRU) receiving a first set of one or more initial access signals from a Transmission/Reception Point (TRP), wherein the first set of one or more initial access signals indicates that the TRP is in a dormant state, sending an echo signal to the TRP, wherein one or more transmission parameters of the echo signal are derived from the first set of one or more initial access signals received from the TRP, monitoring for a second set of one or more initial access signals from the TRP after transmitting the echo signal, and receiving the second set of one or more initial access signals, the second set of initial access signals comprising information associated with accessing the TRP. Sets of one or more initial access signals may be received from a plurality of TRPs in an area. The second set of one or more initial access signals may be received from a TRP that is closest to, or has a strongest signal strength for transmitting to, the WTRU.

Systems, methods, and instrumentalities are disclosed for reducing energy consumption by a Transmission/Reception Point (TRP), comprising entering a dormant state, periodically sending a first set of one or more initial access signals while in the dormant state, wherein the first set of one or more initial access signals is a subset of signals used in a higher availability state, receiving an echo signal from a wireless transmit receive unit (WTRU), and, in response to receiving the echo signal, transitioning to the higher availability state, and sending a second set of one or more initial access signals comprising information associated with accessing the TRP.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
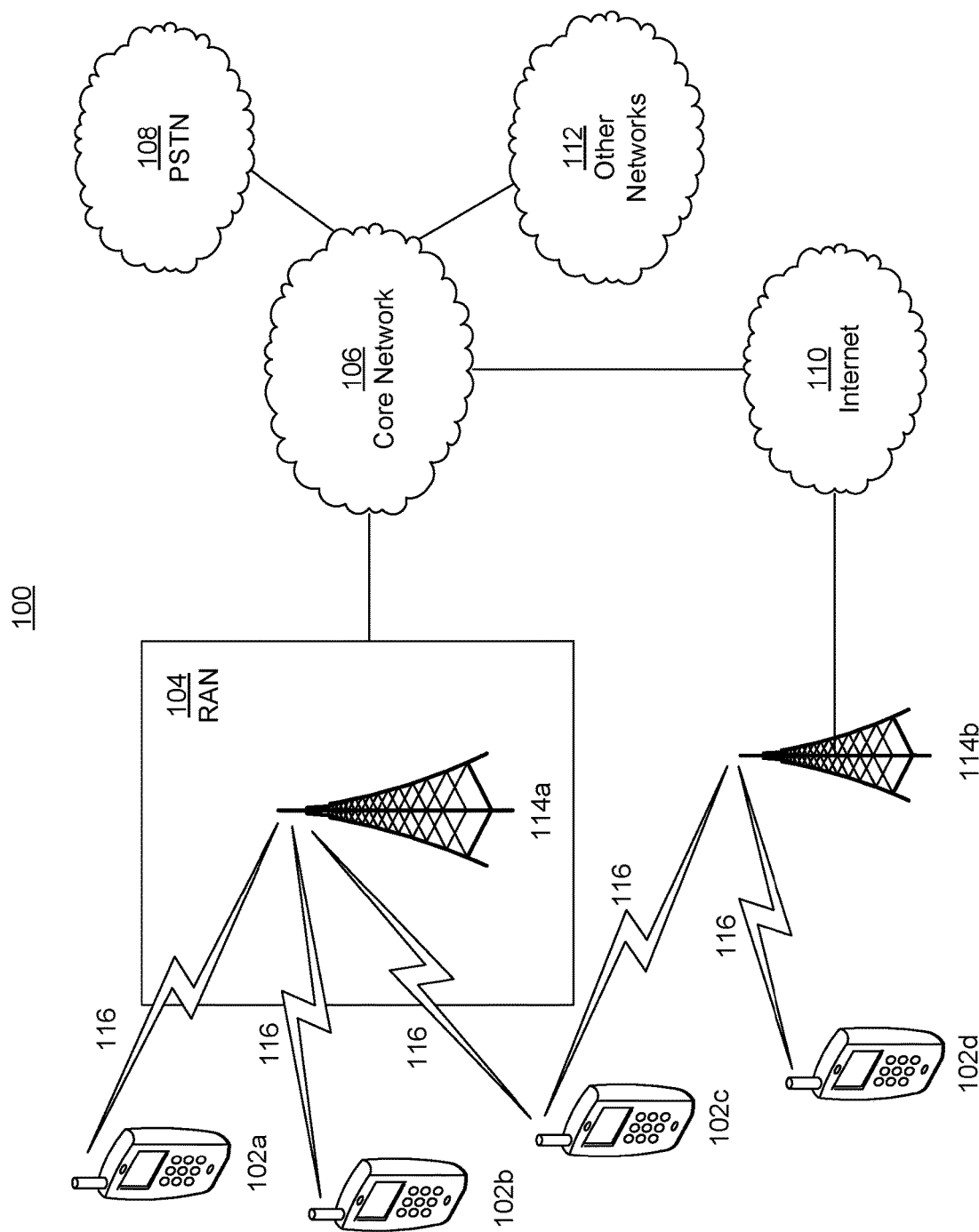
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
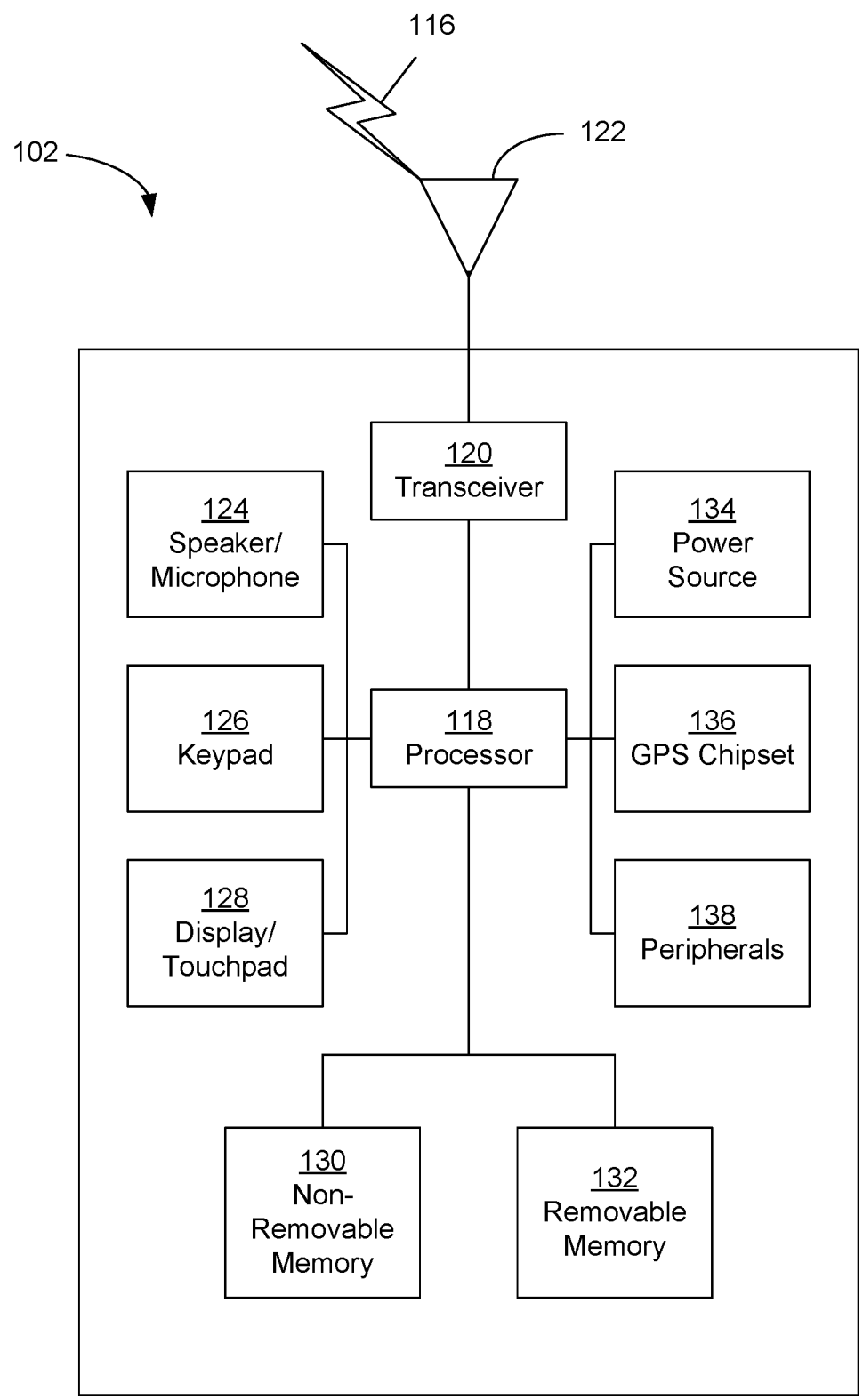
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
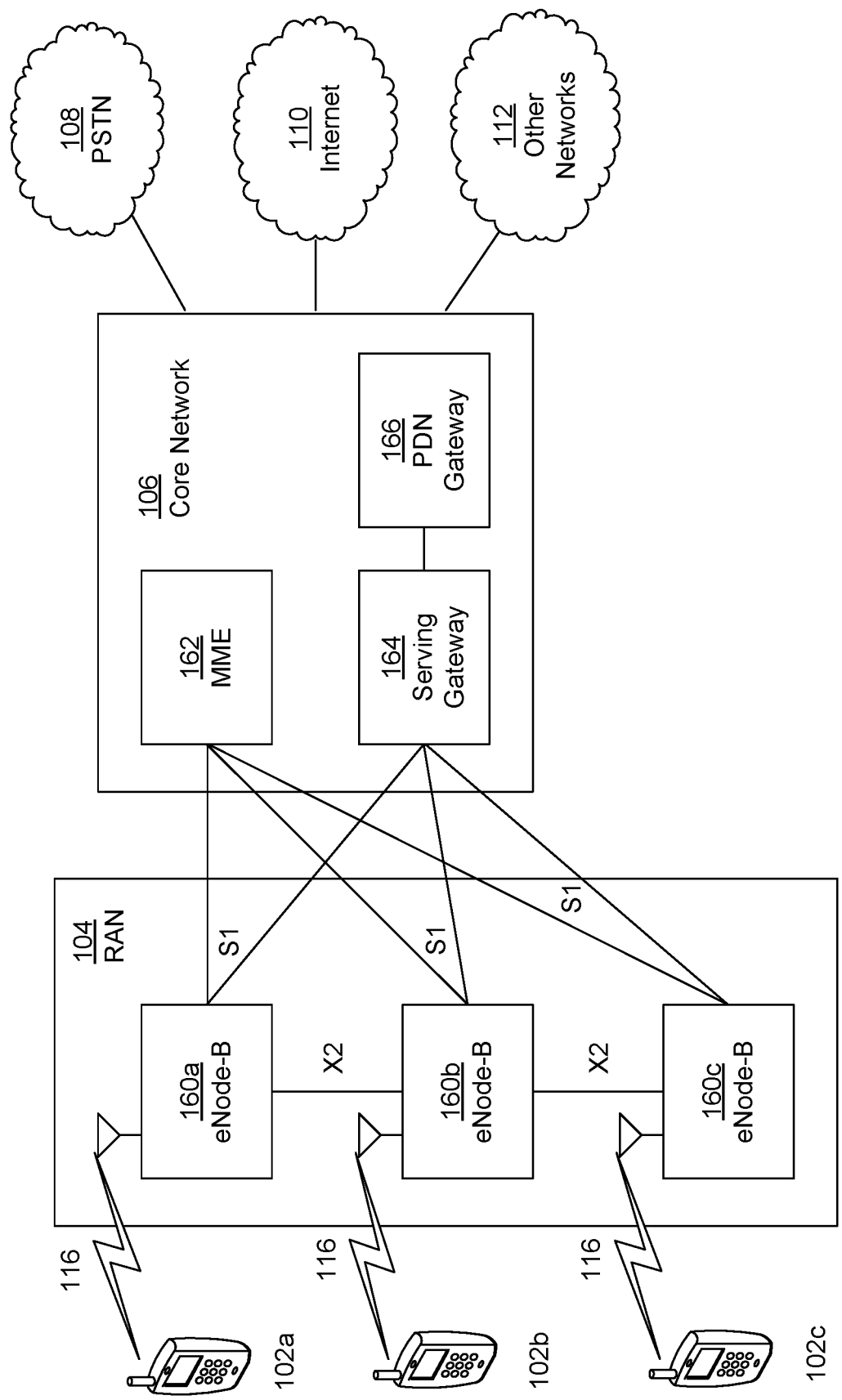
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
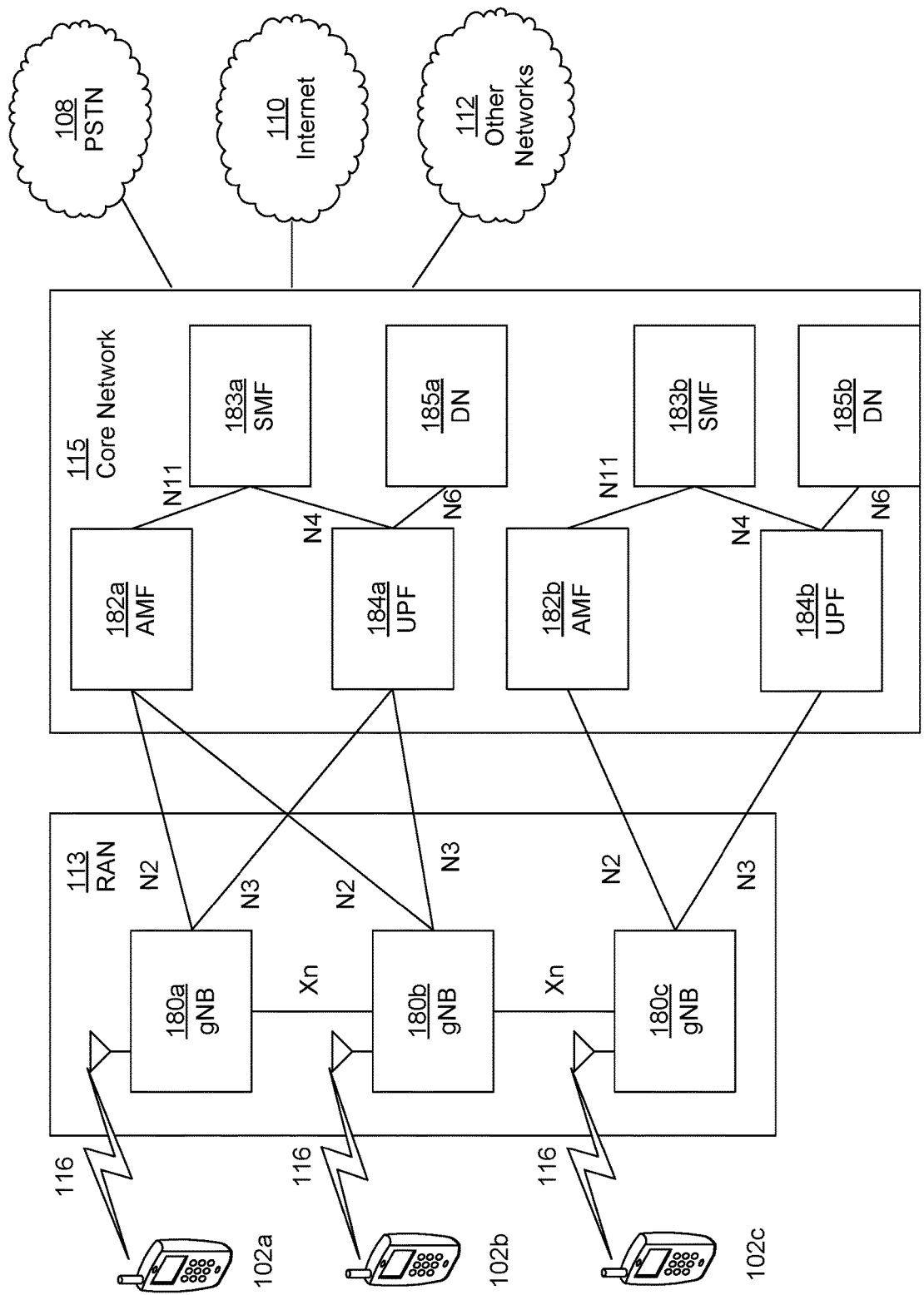
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

5G New Radio (NR) may support usage scenarios beyond mobile broadband, such as massive machine type communication (mMTC), ultra-reliable and low latency communication (URLLC), and enhanced mobile broadband (eMBB). 5G NR may support higher data rates and increased spectrum efficiency.

Radio access network (RAN) energy consumption may be minimized while increasing area traffic capacity and/or network energy efficiency. Energy consumption by network equipment may be a function based on many factors, e.g., such as maximum transmit power, antenna configuration and operating bandwidth. Energy consumption may be reduced, for example, by turning off transceivers (or a module thereof) when no traffic is being served by the equipment and/or when no terminal needs to access the network. Network equipment (e.g., transmission/reception point) covering small areas may be turned off more frequently. Equipment covering a small area may be part of a dense deployment. The percentage of time when such equipment may be unused may be relatively high.

5G NR may (e.g., also) support operation in higher frequency bands (e.g., 100 GHz). The link budget at higher frequencies may be challenging for cells (even those with relatively small range), which may be addressed by support for beamforming techniques.

Network energy consumption may be reduced, for example, by turning off transmission and/or reception functions of equipment when service is not being provided to a WTRU. A network may not be aware of the existence of one or more WTRUs in the coverage area of turned-off equipment. For example, a WTRU may not have been connected to the network or may not have been receiving service at the time equipment turned off a transceiver. A WTRU in this situation may not be able to identify and/or access the system unless network coverage is available from other equipment (such as a macro eNB), which may not be the case in some deployment scenarios where a WTRU is only in-coverage of a small cell but not a macro cell. Small cells may be deployed indoor or underground, for example, to fill a coverage hole. Turning off network equipment supporting the small cells may leave a WTRU without access.

Network equipment (TRP) may be turned on intermittently to transmit access signals (such as synchronization sequence, discovery signals and/or system information) to maintain access opportunities. However, a WTRU may need to leave its receiver turned on for a long time on each carrier to have a significant chance of detecting the cell in a reasonable time, which may be detrimental to WTRU power consumption. Use of beamforming (or beam sweeping) by the network may compound access opportunities, e.g., given that a cell may (e.g., only) be detectable when transmission is performed using a specific beam.

Energy efficient operation for network equipment and WTRUs may be implemented, for example, by defining "availability" states in terms of signals needed for detection and access to the network and WTRU transmissions that may trigger a change of state (e.g., where the network may transmit additional signals). Such transmissions from a WTRU may significantly speed-up access to a network that may initially be in an energy-efficient or dormant state.

Energy efficient transmission may be provided for essential broadcast signals. In an example, hierarchical transmission may be provided for (e.g., essential) TRP access signals from a network perspective.

An eNB may (e.g., using wide beam width) sweep beamformed synchronization signals with long periodicity. A time domain configuration of a synchronization signal beam may be pre-defined and may include maximum periodicity and minimum dwell time. A WTRU may perform blind detection to identify the periodicity and dwell time used in the geographical area the WTRU may be located in. The WTRU may detect synchronization signals and may (e.g., in turn) synchronize with the cell.

Beam sweeping synchronization signals may carry basic system access information. For example, if the beam sweeping synchronization signals include basic system access information without carrying other types of information, the amount of system access transmission overhead may be significantly reduced. This may allow Transmission/Reception Points (TRPs) to enter a state where a TRP transmits a limited set of signals (e.g., a subset of signals used in high availability/normal availability state). For simplicity, this state may be referred to as a "dormant," "low availability," or "inactive" state. TRPs may transmit small amounts of (e.g., essential) access information during the dormant state as compared to a during a wake-up period where the TRP begins to transmit additional access information. The wake-up period may be referred to or correspond to an active period, an awake period, a high availability period, a nominal state, and/or a period where the TRP transitions from the dormant or low-activity state (e.g., associated with reduced signaling overhead) to its active or normal state (e.g., where additional access information is transmitted). Transmission of further MIB/SIB information may be on a per-request basis, for example, when TRPs may detect a demand for a transmission.

In an example, a beam sweep during a "wake-up" period may include (e.g., only) a synchronization signal that may provide initial timing acquisition and a frequency error correction offset. Dormant or inactive TRPs may or may not transmit further TRP access information (e.g., master information block (MIB) or system information block (SIB)) in beam sweeping. A synchronization signal transmission may have a periodicity aligned with a TRPs' sleep cycle, which may be on the order of seconds.

TRPs may (e.g., depending on the level of low availability) transmit a small payload (e.g., a system signature) multiplexed with a synchronization. A beam specific reference signal may be transmitted, for example, to allow WTRUs to demodulate a system signature.

In an example, TRPs may have multiple (e.g., three) levels of transmission, e.g., using beamsweeping to provide a hierarchy of essential TRP access information.

A first level may be, for example, a periodic transmission with very long cycle (omni-directional or wide beam) without a payload while providing synchronization signals.

A second level may comprise, for example, a requested or periodic transmission with a long cycle (e.g., may be further beamformed). A second level transmission may comprise a small payload (e.g., system signature) and may provide a low density Beam Specific Reference Signal (BSRS) for system signature demodulation.

A third level may be, for example, on request or triggered transmissions, which may comprise, for example, TRP-specific system broadcast information with a demodulation reference signal (DMRS).

Levels may correspond to "availability states," e.g., from a WTRU perspective.

A TRP may transmit requested or triggered TRP access signals that may include (e.g., essential) access information, such as MIB/SIB. Requested or triggered signals may be triggered and requested (e.g., only) by pre-defined events detected by TRPs. A hierarchy of (e.g., essential) TRP access information transmission may allow a significant reduction of "always-on" system transmission, which may reduce signaling overhead.

An accessibility level of an initial access signal set may be transmitted by a TRP. An accessibility level of an initial access signal set transmitted by a TRP may be different in each availability state. The initial access signal set may include one or more of synchronization signal, system signature, broadcast channel, etc. The accessibility level may be determined by the initial access signal set transmission configurations. The initial access signal set transmission configurations may include one or more of periodicity of the initial access signal transmission, (such as, for example, 5 ms, 40 ms, 100 ms, 1 s, etc.), channel raster of the carrier center frequency (such as, for example, 200 kHz, 1 MHz, 5 MHz, etc.), transmission bandwidth (such as, for example, 2 MHz, 10 MHz, 20 MHz, etc.), numerology (such as, for example, SCS of 15 kHz, 60 kHz, 240 kHz, etc.), transmission scheme (such as, for example, repetition in frequency domain), and beamforming configuration (such as, for example, single-omni-directional-beam transmission, multi-beam-based sweeping).

Initial access signal sets of variable accessibility level may allow the network to conserve energy when the demand of network access is low. For example, when a TRP transitions to a low availability state (e.g., "dormant"), it may select a set of initial access signals of low accessibility and may optimize its energy saving.

A TRP-specific initial access signal set and an area-specific initial access set may be utilized by a TRP. The TRP-specific initial access signal set may include initial access signals. The initial access signals may uniquely identify a specific TRP and may be transmitted by the TRP. The area-specific initial access set may include initial access signals transmitted in certain manner (e.g., according to system frame number (SFN) by multiple TRPs). The area-specific initial access set may include initial access signals that uniquely identify a specific area covered by transmissions of these TRPs. For example, a WTRU may detect an area-specific set of initial access signal of a low accessibility level (e.g., long periodicity, single-beam-based, and/or large frequency raster). The WTRU may send an uplink transmission (e.g., an "Echo" transmission) and monitor a second initial access signal set. The TRPs may receive the transmission and coordinate to select a TRP to transition to a higher availability state and transmit a TRP-specific initial access signal set of a high accessibility level. The WTRU may detect the TRP-specific initial access signal set and access the transmitting TRP.

A first initial access set of low accessibility level may be associated with a relatively low search hypothesis. In this manner, a WTRU may access/process the first initial access set with relatively low latency and low processing effort, which will allow the WTRU to conserve energy. When (e.g., only when) the WTRU detects a first set of initial access signals, the WTRU may continue with a more refined access procedure with large number of reception hypotheses.

Figure 2A:
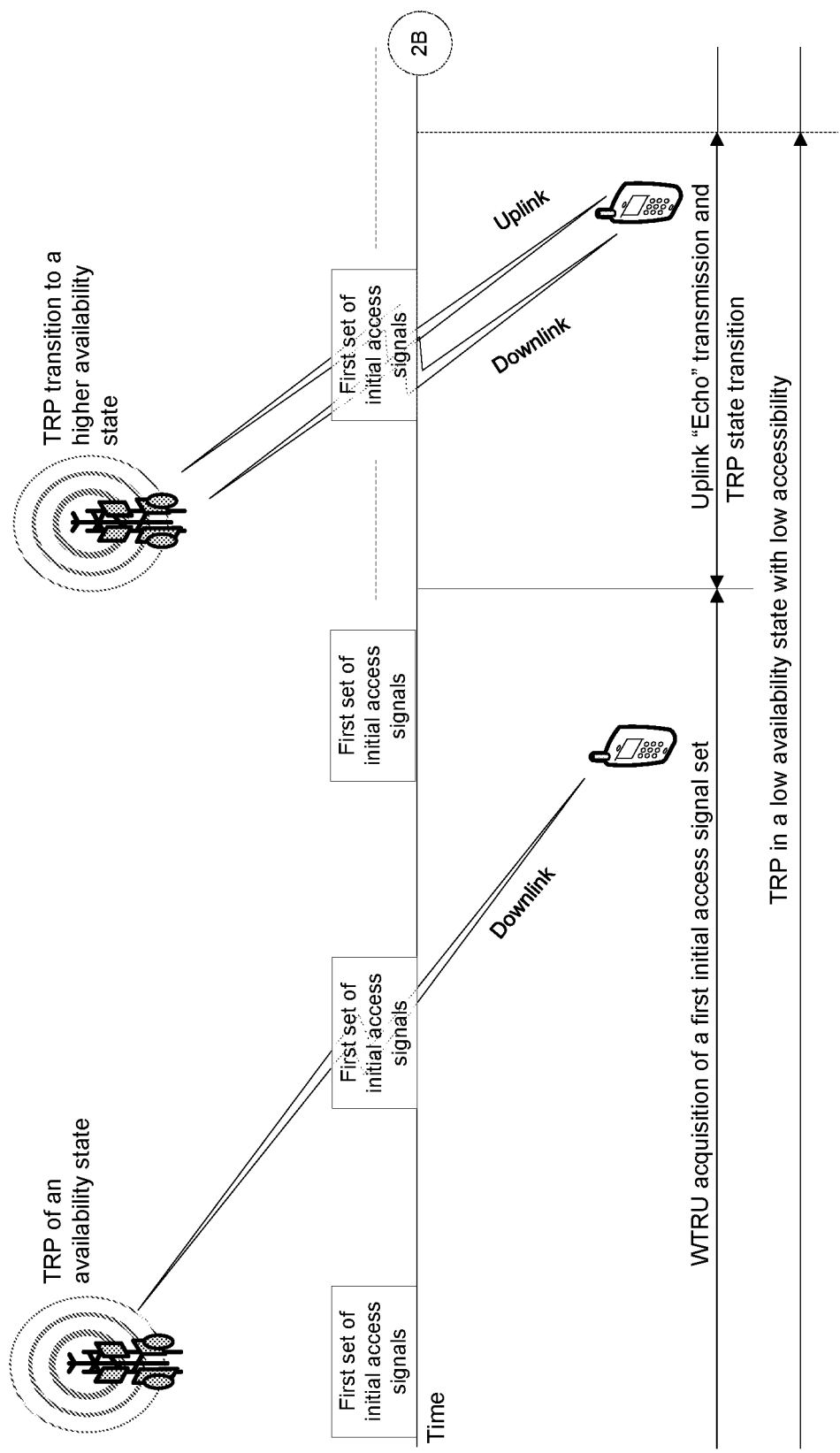
FIG. 2A-B is an example of transmissions by a TRP and a WTRU while a TRP is in an energy-saving state and advances to a higher availability state.
Figure 2B:
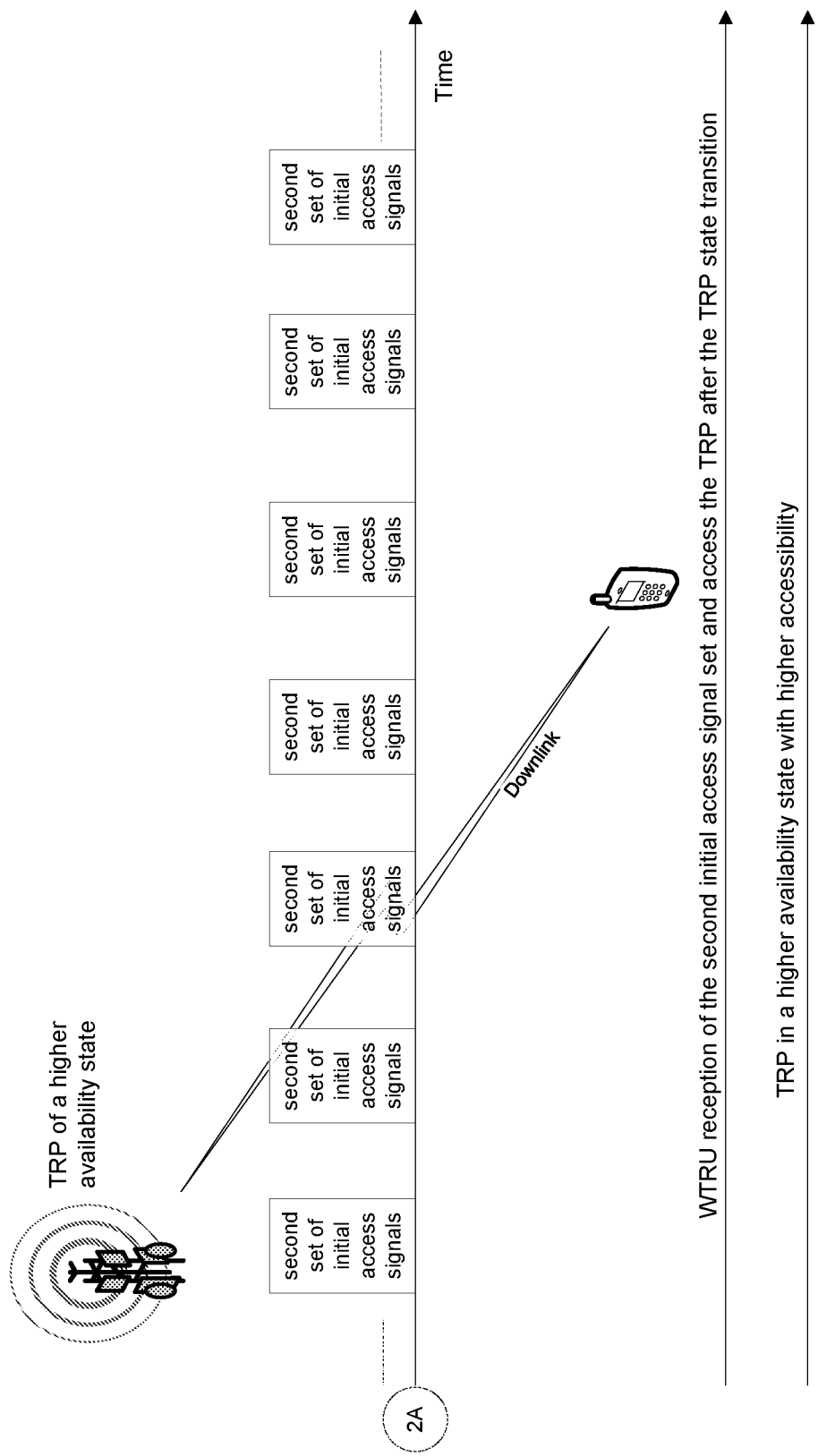

FIG. 2A-B is an example of transmissions by a TRP and a WTRU while a TRP is in an energy-saving low-availability state and advances to a higher availability state.

There may be a linkage between the first initial access signal set and the second initial access signal. For example, the uplink transmission may carry information indicative of properties or parameters of the detected first initial access signal set, which may be used by TRPs to determine the second initial access signal transmission parameters. For example, the sequence and/or frequency resource used for the uplink transmission may indicate the frequency allocation where the first initial access signal set were detected and the second initial access signal set may be transmitted within the same frequency allocation (e.g., as the first initial access signal set).

In another example, when the network/TRP receives an echo transmission from a WTRU, the network/TRP may use a different signature sequence on one or more signals in the second initial access signal set that can be mapped to different center frequencies. As a result, the WTRU may detect the second initial access signal set with finer frequency raster.

In an example, the WTRU may decode a system signature or broadcast channel of the first initial access signal set and obtain information that may provide the WTRU with the transmission parameters of the second initial access signal set.

The information of the second initial access signal set may be indicated implicitly by transmission configuration/properties, for example by transmission configuration/properties of the first initial access signal set. The information of the second initial access signal set may be indicated explicitly. For example, the content of the first initial access signal set may include one or more of the following: a timing relationship between the first and second initial access signal sets (such as, for example, a time domain distance in terms of number of symbols, slots, or sub-frames); periodicity of the second initial access signal set (such as, for example, an absolute periodicity or a relative offset to the detected periodicity of the detected first set of initial access signals in terms of number of symbols, slots, or sub-frames); transmission bandwidth allocation (such as, for example, a frequency offset between the detected center frequency of the first initial access signal set and the second set; in another example, an absolute value in terms of frequency, PRB number, or sub-carrier number may be applied); frequency raster of second initial access signal set; numerology use for the second initial access signal set (such as, for example, a scaling factor relative to the numerology used for the detected first initial access signal set; in another example, subcarrier spacing and CP length may be explicitly signaled or implicitly using indices based on a pre-defined numerology table); scrambling/spreading code selection of the second initial access signal set (such as, for example, the scrambling code index, spreading rate, and sequence index may be signaled; in another example, the scrambling code index may be the same as that used in the detected first initial access signal set); and beamforming setting of the second initial access signal set (such as, for example, an indicator regarding whether the second initial access signal set and detected first set may be in the same beam or different beams. In case of the different beams, the beam sweeping periodicity, dwell time, and other sweeping configuration may be signaled).

A WTRU may use an "echo" transmission to request (e.g., further) TRP access information. In an example, a WTRU may wake up one or more inactive TRPs and may request or trigger TRP access information transmission by using an echo transmission. A WTRU may request and trigger a next level of TRP (e.g., essential) access information transmission, such as an increase in availability state.

In an example, a WTRU may determine an availability state for a network, e.g., based on a detected subset of signals that may be required for cell search and/or initial access. For example, a WTRU may detect a periodic synchronization signal and synchronize with the detected downlink beam. A WTRU may establish a timing reference, e.g., based on the detected synchronization timing in terms of symbol and sub-frame location. A WTRU may align the downlink timing with the downlink beam synchronization signal. A WTRU may adjust the reference frequency based on the carrier frequency offset estimated on the synchronization signal. A WTRU may attempt to detect the next level of TRP access information (e.g., system signature or MIB/SIB).

A WTRU may (e.g., when it does not detect further TRP system access signals) determine that the network is in a state where (e.g., only) a subset of the signals that may be required for detection and access are available (e.g., no payload or small payload, level 1 or level 2, etc.). A WTRU may perform a specific transmission (e.g., a "wake-up"

signal). Transmission properties may depend on the detected property of a synchronization signal. For example, a WTRU may "echo" received synchronization by Amplify and Repeat, e.g., at a specific delay following reception of the synchronization signal. The WTRU may not need to apply any baseband processing and may amplify and repeat the receive sync signal on same resource. An amplify-and-repeat echo transmission may provide low latency and may conserve energy, e.g., without baseband processing. A network may monitor echo transmission, for example, by using a low-complexity and/or energy efficient receiver module.

A TRP synchronization transmission may convey TRP sleep and power class information. A periodic synchronization signal may carry TRP signal signatures that may be indicative of TRP sleep cycles (or availability state) and/or power class information. A WTRU may access a TRP (e.g., differently) based on detecting the signatures. A beamforming configuration of a synchronization sequence may differ and may carry different meanings. A WTRU may detect a signature transmission beamforming property, e.g., an omni-directional beam or a narrow beam.

A WTRU may use TRP power class information to determine the transmit power of the synchronization signal. A WTRU may (e.g., based on the transmit power and the received energy level) estimate a path loss and use it to set an "echo" power. The WTRU may loop back the received synchronization RF signal to the transmitter chain and may transmit the synchronization power using the "echo" power. A WTRU may determine whether to "echo" the downlink synchronization signal, for example, based on a received synchronization level.

A WTRU may be provided with an "echo" uplink transmission configuration. A WTRU in connected mode may send an "echo" uplink transmission to a Macro TRP to indicate the detection of an initial signal set of low accessibility level. The WTRU may receive the transmission configuration via Layer 1 (L1)/physical layer signaling (e.g., via a physical downlink control channel) and/or RRC signaling from the connected PCell/Macro TRP.

A WTRU may obtain a "light" uplink transmission based on one or multiple signals of the detected first initial signal set of one TRP. For example, the broadcast channel may include a transport format configuration. The frequency allocation and numerology of the synchronization signal may indicate a corresponding resource allocation of the uplink transmission.

The uplink transmission may be generated using relatively limited baseband processing and may apply, for example, an analog single or multi-tone transmission. The tone allocation may be configured by a connected Macro TRP or indicated explicitly or implicitly by the first initial signal set.

The WTRU may receive configuration from the Macro TRP about the initial signal set configuration of a set of TRPs and the WTRU may periodically detect and measure the initial signals. The Macro TRP may also trigger a measurement of the initial access signals set to obtain a potential target TRP for WTRU handover (HO). The triggering event may, for example, occur if no inter-TRP RSRP measurement is above a pre-configure threshold for all active TRPs. This may allow the Macro TRP to wake up the inactive TRPs before the WTRU may lose connection. Multiple TRPs may have detected or/and measured the WTRU "echo" uplink transmission and may have a quantitative metric associated with the uplink transmission. The Macro TRP may collate the metric data and determine which TRP or TRPs may transition to a different availability state.

A WTRU uplink transmission may use geographic information. A WTRU may estimate the geographic area and determine the associated transmission. The associated transmission may include preconfigured resource allocation and transmission configuration parameters. This may reduce the WTRU's access search over a large number of frequency bands. The initial access signal configuration (e.g., raster) may be region dependent and geographic information may assist the initial access procedure.

A TRP may be selected for availability state transition. Multiple WTRUs with the same area-specific initial access signal set coverage may transmit identical uplink signals after detection of the first set of initial access signal set. The transmissions may arrive at a same or different TRP as different multi-path versions of the same signal. Each TRP may accumulate the energy to determine which TRP may be closest to most of the WTRUs. The closest TRP may be selected to transition to a different availability state to provide further access for all the WTRUs. The network may select all TRPs with detected energy above a threshold. The network may select a TRP with the highest detected energy.

The WTRU may refine the TRP selection using the second initial access signal set. The signals of the second initial access signal set may be more available and/or allow more processing for the WTRU to select the best TRP to access.

A WTRU may beamform an "echo" transmission to wake up a TRP and/or to request a next level of access information. A WTRU may apply beamforming to an "echo" transmission, for example, based on spatial information that the WTRU may estimate using the received downlink synchronization signal. For example a WTRU may estimate an Angle of Arrival (AoA) of the "best" received synchronization and may beamform the "echo" transmission at the corresponding Angle of Departure (AoD). The "best" received synchronization signal may be determined to have the maximum received energy level among multiple (e.g., all) detected signals (e.g., signals having a received energy level above a pre-defined threshold). A WTRU may correspond with the closest TRP or a TRP providing the highest quality signal by beamforming based on the "best" received synchronization signal.

A WTRU may transmit an "echo" according to a pre-defined timing relative to the timing determined based on an associated downlink synchronization signal. In an example, a WTRU may transmit an "echo" (e.g., immediately) after the timing when the downlink synchronization signal may be received. For example, a WTRU may transmit the "echo" at the start boundary of the symbol following the end of the last symbol used by the downlink synchronization.

The WTRU may send an "echo" transmission with a length that may be the same as the duration of the downlink synchronization over the (e.g., entire) TRP "wake-up" period. A WTRU may have a pre-defined timer or counter, for example, to limit the number of TRP "wake-up" periods for the "echo" transmissions without receiving further TRP access information.

A TRP may monitor an uplink "echo" level during synchronization transmission sweeping during a "wake-up" period. An "echo" level may be an accumulation of energy from a plurality of transmissions from a plurality of WTRUs that may have detected the synchronization signal and requested further system access information. An operator may have flexibility to set the level dynamically, e.g., according to varying capacities of different TRPs. For example, certain dormant TRPs may be configured not to respond to any "echo" transmission regardless of the "echo" energy level.

A WTRU may (e.g., following transmission of a wake-up signal) start a timer of a pre-defined or pre-configured value and may attempt to receive further signals that may be required for detection and/or access to the network, such as discovery signals and/or a broadcast channel. A WTRU may (e.g., when at least one further signal is detected) stop the timer and may determine whether the network is in a higher availability state. A WTRU may attempt normal initial access to the network, for example, when the availability state allows it. A WTRU may send a transmission comprising a second wake-up signal to raise the availability state, for example, when the availability state is determined to be insufficient. A WTRU may (e.g., when a timer expires) determine that the network is in a lower availability state. A WTRU may (e.g., when a low availability state is detected) start another timer and may re-attempt transmission of a wake-up signal, e.g., after expiration of the timer.

In an example, a pre-defined monitor window may be used following an "echo" transmission. A WTRU may monitor the TRP's response in "wake-up" periods within a monitoring window. A WTRU may (e.g., during monitoring) look for a reference signal that may have an index pre-configured to map the detected synchronization signal. The WTRU may use the reference signal to decode a next level of system information, which may include system bandwidth, system numerology, control signal bandwidth, control signal frequency allocation, etc.

A TRP response may be beamformed toward the direction where most of the uplink "echo" transmission energy may be detected. System information may include a random access configuration for the WTRU to further access the TRP.

Figure 3A:
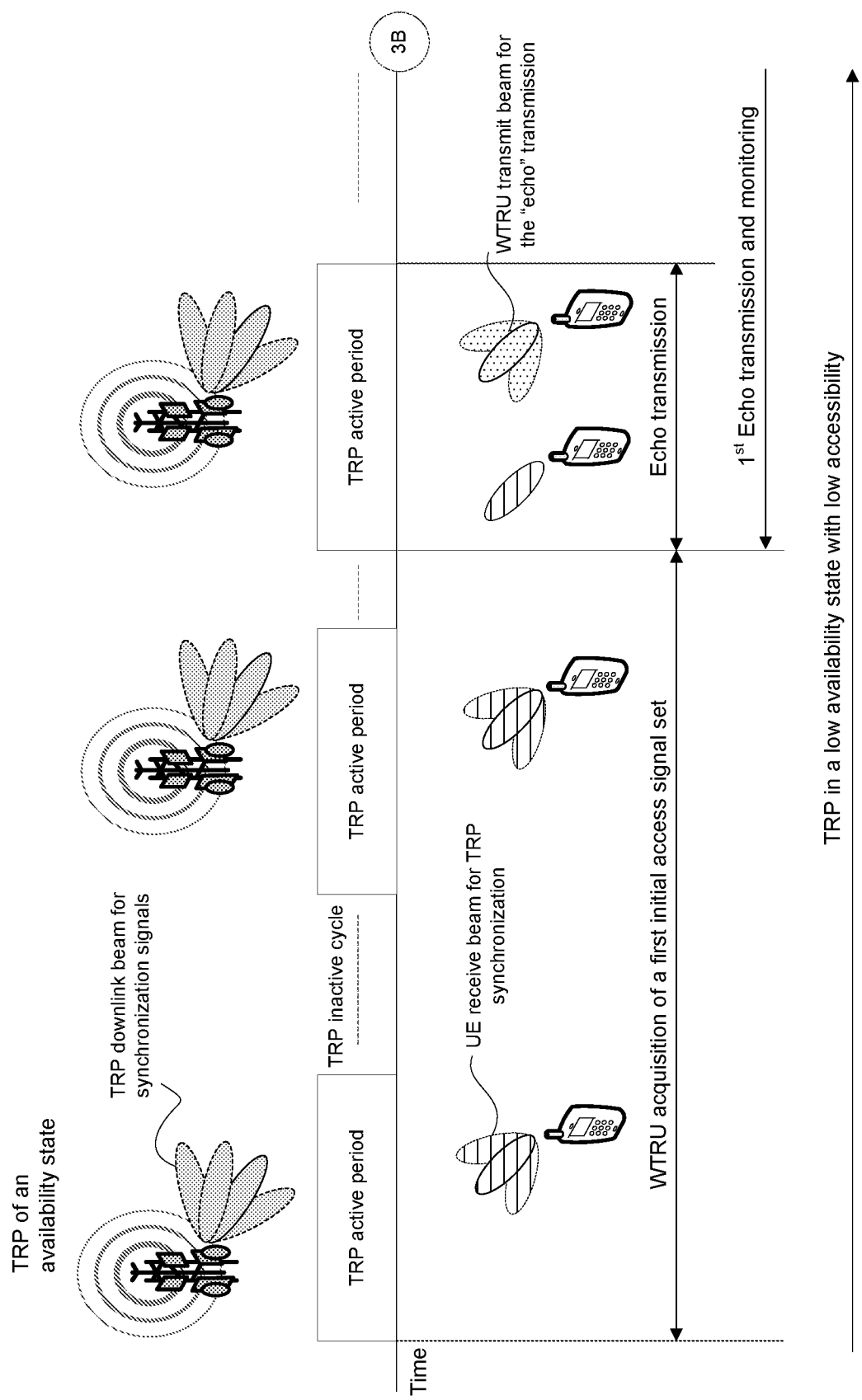
FIG. 3A-B is an example of transmissions by a TRP and a WTRU while a TRP is in an energy-saving state and advances to a higher availability state.
Figure 3B:
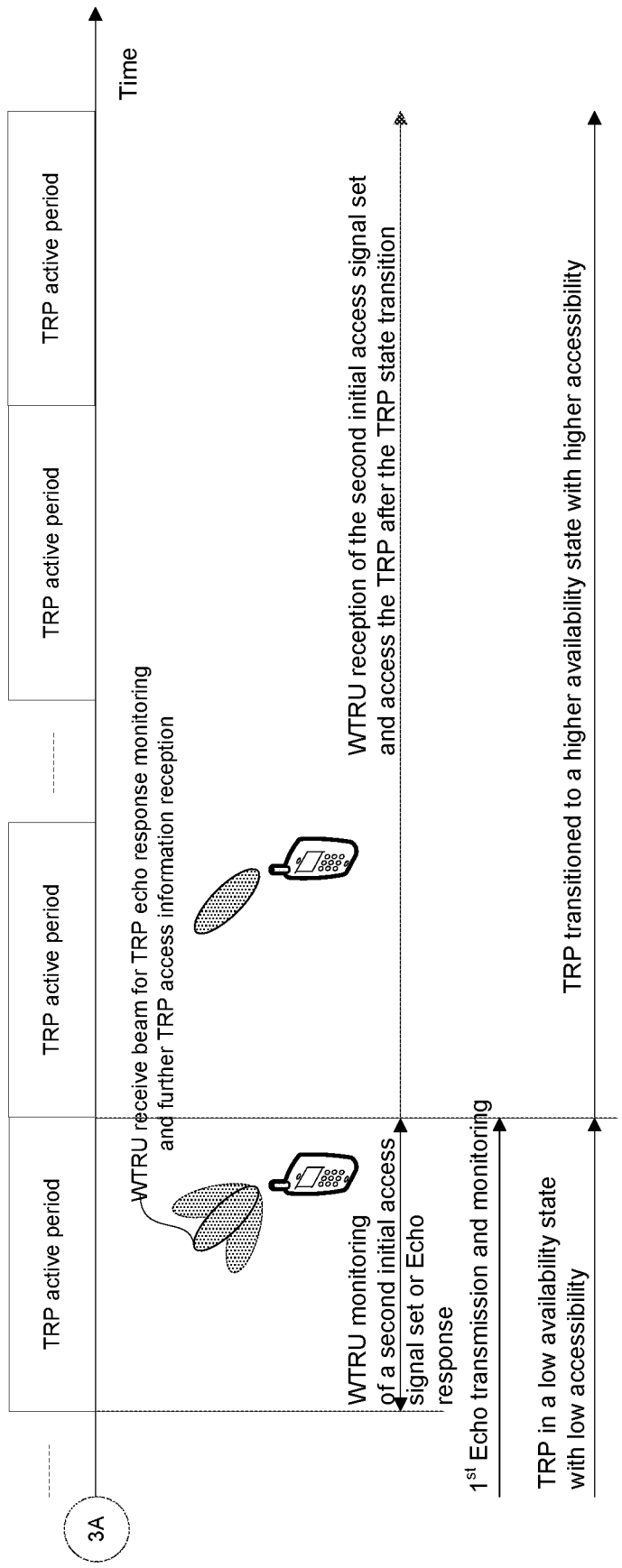

FIG. 3A-B is an example of transmissions by a TRP and a WTRU while a TRP is an energy saving (e.g., dormant or inactive) state and advances (e.g., wakes up) to a higher availability (e.g., active) state. In an example, a WTRU may receive a TRP synchronization signal. A WTRU may provide an "echo" response. A TRP response may come after one or more "echo" transmissions by a WTRU. A TRP and WTRU may (e.g., based on the estimated beamforming information of the "echo" and response transmission) pair the downlink transmit and receive beams. A TRP may transmit and a WTRU may receive further levels of TRP (e.g., essential) access information.

A WTRU may apply an "echo" transmission, for example, to acquire a system information update, perform a cell search or request a neighbor TRP RRM measurement. In an example, a WTRU may detect a neighbor TRP synchronization transmission during a wake-up period and may use the "echo" transmission to request a neighbor TRP measurement.

An "echo" transmission may or may not be an amplify-and-repeat version of a downlink synchronization signal. An echo transmission may be a pre-configured Inter-TRP coordination and request reference signal transmission for a neighbor TRP measurement. A WTRU may detect a sync signal transmission of neighbor TRPs and may transmit a (e.g., special) sequence to request reference signal transmission for measurement. A reference signal transmission may be of small bandwidth and short duration. A requested reference transmission may have a (e.g., special) numerology. One or more types of "echo" transmission may involve (e.g., require) WTRU baseband processing.

A TRP may be selected for availability state transition. Multiple WTRUs with the same area-specific initial access signal set coverage may transmit identical uplink signals after detection of the first set of initial access signal set. The transmissions may arrive at a same or different TRP as different multi-path versions of the same signal. Each TRP may accumulate the energy to determine which TRP may be closest to most of the WTRUs. The closest TRP may be selected to transition to a different availability state to provide further access for all the WTRUs. The network may select a number of TRPs with detected energy above a threshold, for example all TRPs with a detected energy above the threshold. The network may select a TRP with the highest detected energy.

The WTRU may refine the TRP selection using the second initial access signal set. The signals of the second initial access signal set may be more available and/or allow more processing for the WTRU to select the best TRP to access.

A WTRU uplink transmission may use geographic information. A WTRU may estimate the geographic area and determine the associated transmission. The associated transmission may include preconfigured resource allocation and transmission configuration parameters. This may reduce the WTRU's access search over a large number of frequency bands. The initial access signal configuration (e.g., raster) may be region dependent and geographic information may assist the initial access procedure.

A "light" uplink transmission for the WTRU may be provided. A WTRU in connected mode may send a "light" uplink transmission to a Macro TRP to indicate the detection of an initial signal set of low accessibility level. The WTRU may receive the transmission configuration via L1 or RRC signaling from the connected Pcell/Macro TRP.

In another example, the WTRU may obtain the "light" uplink transmission based on one or multiple signals of the detected first initial signal set of one TRP. For example, the broadcast channel may include a transport format configuration. The frequency allocation and numerology of the synchronization signal may indicate a corresponding resource allocation of the uplink transmission.

The uplink transmission may have a limited baseband processing. The uplink transmission may apply, for example, an analog single or multi-tone transmission. The tone allocation may be configured by a connected Macro TRP or indicated explicitly or implicitly by the first initial signal set.

The WTRU may receive configuration from the Macro TRP about the initial signal set configuration of a set of TRPs. The WTRU may periodically detect and measure the initial signals. The Macro TRP may also trigger a such measurement to obtain a potential target TRP for WTRU HO. The triggering event may, for example, occur if no inter-TRP RSRP measurement is above a pre-configure threshold for all active TRPs. This may allow the Macro TRP to wake up the inactive TRPs before the WTRU may lose connection.

Multiple TRPs may have detected or/and measured the WTRU "light" uplink transmission and may have a quantitative metric associated with the uplink transmission. The Macro TRP may collate the metric data and determine which TRP or TRPs may transition to a different availability state.

Systems, methods, and instrumentalities have been disclosed for network energy efficiency procedures that may be implemented in a Wireless Transmit/Receive Unit (WTRU) and/or network Transmission/Reception Point (TRP). A WTRU may determine an availability state for a TRP, for example, based on a detected signal or subset of signals that may be required for cell search and/or initial access. A WTRU may transmit a (e.g., wake-up) signal to trigger an increase in the availability state of the network (e.g., from an energy-efficient, dormant or inactive state to an active state). A WTRU may detect a synchronization signal from an inactive TRP and may use an "echo" transmission to wake up the inactive TRP (e.g., to request further TRP access information to acquire access to the TRP).

Figure 4A:
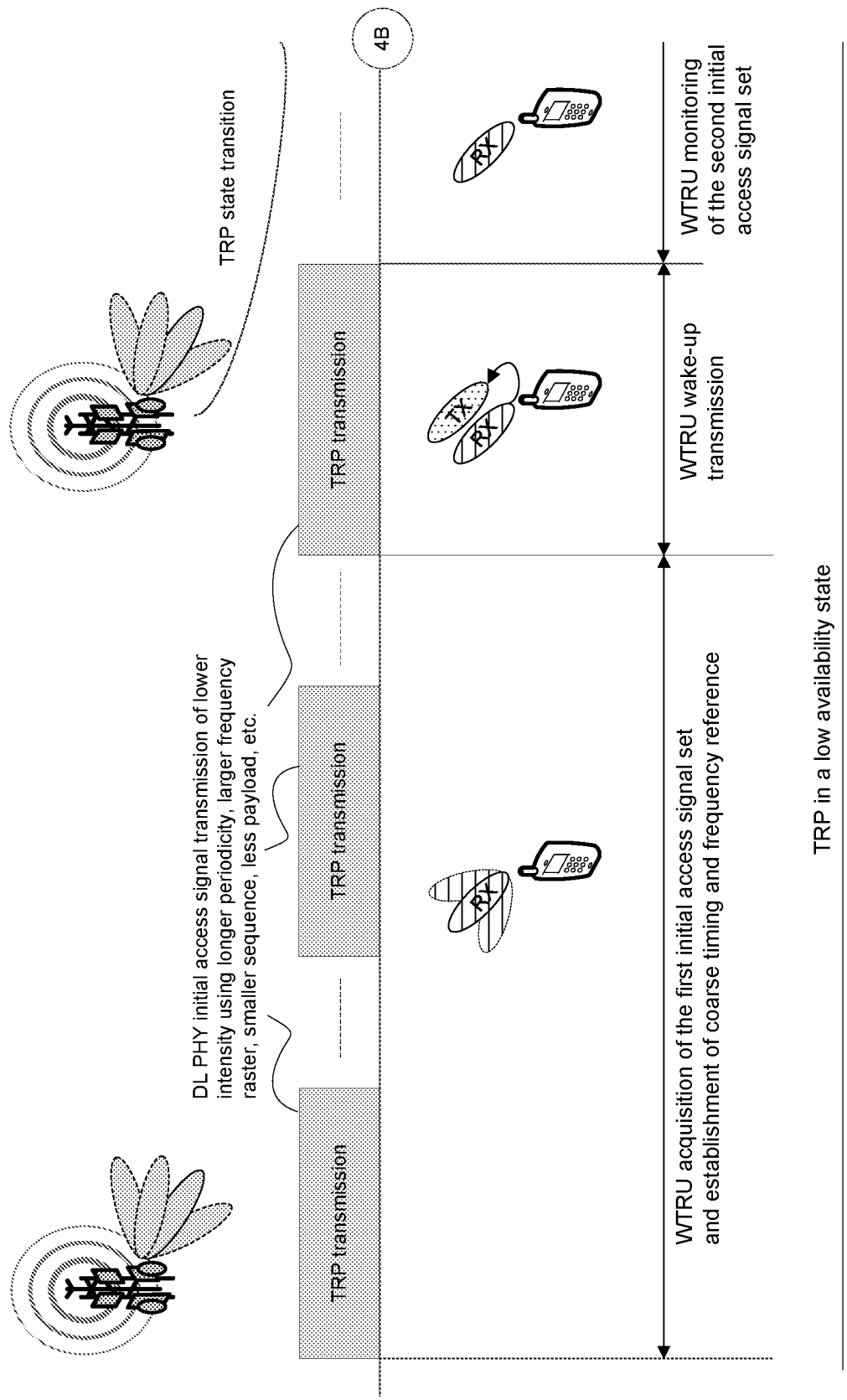
FIG. 4A-B is an example of transmissions by a TRP and a WTRU while a TRP is in an energy-saving state and advances to a higher availability state.
Figure 4B:
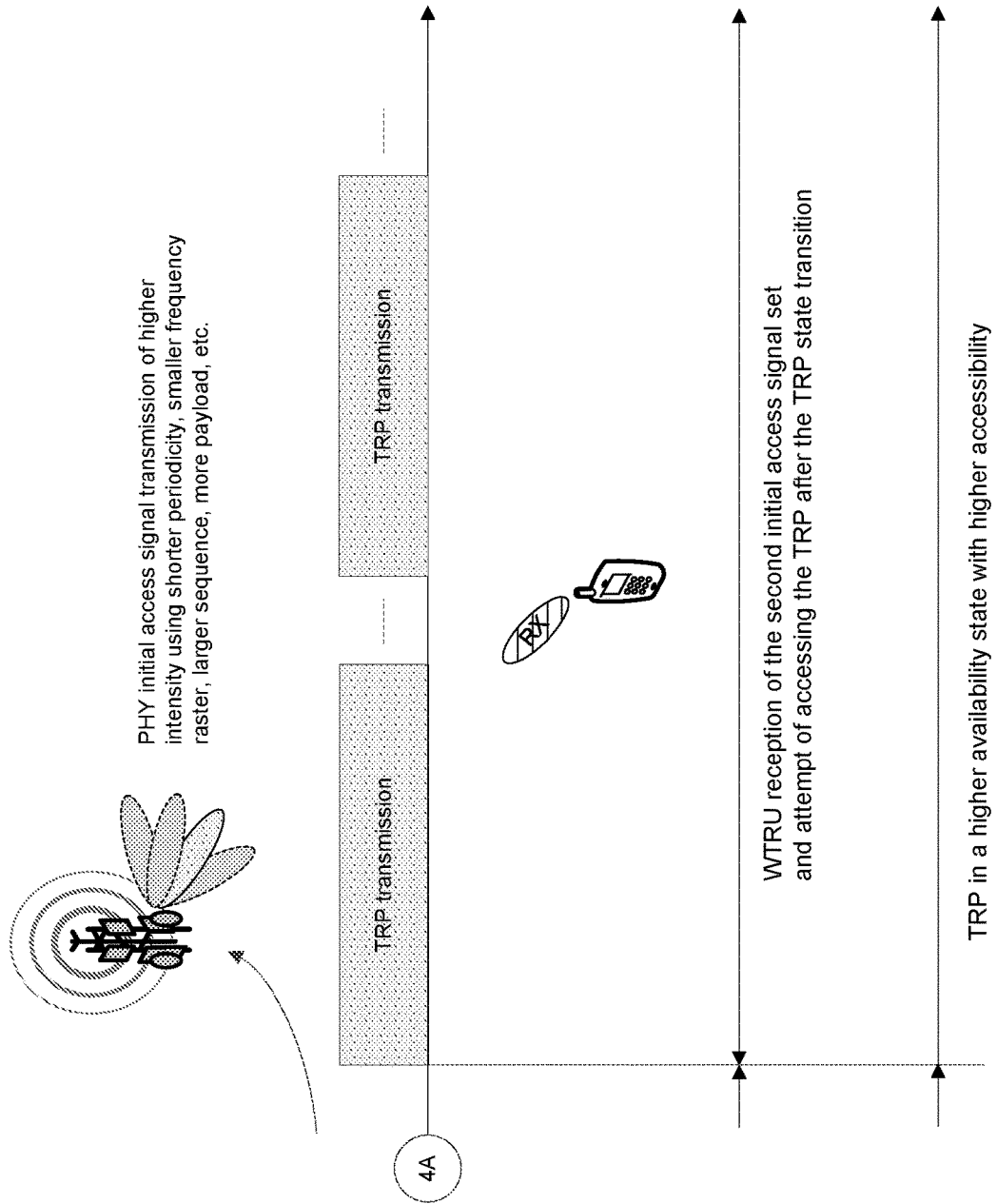

FIG. 4A-B is an example of transmissions by a TRP and a WTRU while a TRP is in an energy-saving state and advances to a higher availability state.

The processes and instrumentalities described herein may apply in any combination, may apply to other wireless technologies, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

The invention claimed is:

1. A method implemented by a wireless transmit/receive unit (WTRU), the method comprising:
   receiving a first set of one or more initial access signals from at least a first Transmission/Reception Point (TRP);
   determining that the first set of one or more initial access signals indicates that at least the first TRP is associated with a first availability level, wherein the first set of one or more initial access signals is a subset of signals associated with a second availability level;
   sending an echo signal to at least the first TRP, wherein one or more transmission parameters of the echo signal are derived from the first set of one or more initial access signals received from at least the first TRP; and
   receiving a second set of one or more initial access signals after transmitting the echo signal, the second set of one or more initial access signals comprising information associated with accessing at least the first TRP.

2. The method of claim 1, wherein the one or more transmission parameters of the echo signal derived from the first set of one or more initial access signals comprise frequency information for the echo signal and timing information for the echo signal.

3. The method of claim 1, wherein the one or more transmission parameters of the echo signal are further derived by amplifying the first set of one or more initial access signals and using the amplified first set of one or more initial access signals as the echo signal.

4. The method of claim 3, wherein the echo signal is derived without performing baseband processing on the first set of one or more initial access signals.

5. The method of claim 1, wherein the one or more transmission parameters of the echo signal derived from the first set of one or more initial access signals comprise a beamforming an angle of departure, wherein the angle of departure is determined based on an estimated angle of arrival of the first set of one or more initial access signals.

6. The method of claim 1, wherein the echo signal indicates that the WTRU is requesting that at least the first TRP transitions from the first availability level to the second availability level.

7. The method of claim 1, wherein the first set of one or more initial access signals indicates power class information for at least the first TRP, and the WTRU determines a power level for transmitting the echo signal based on the power class information.

8. The method of claim 1, further comprising determining one or more of a system bandwidth, a system numerology, a control signal bandwidth, a control signal frequency allocation, or a numerology of at least the first TRP based on the second set of one or more initial access signals.

9. The method of claim 1, wherein the first set of one or more initial access signals is received from a plurality of TRPs in an area, and the second set of one or more initial access signals is received from the first TRP based on the first TRP being the TRP from the plurality of TRPs that is closest to or has a strongest signal strength for transmitting to the WTRU.

10. The method of claim 1, wherein the first set of one or more initial access signals is transmitted in accordance with one or more of a lower power level, a longer periodicity, a larger frequency raster, or a shorter beamforming sequence than that of the second set of one or more initial access signals.

11. A wireless transmit/receive unit (WTRU), comprising:
   a memory; and
   a processor configured to:
      receive a first set of one or more initial access signals from at least a first Transmission/Reception Point (TRP);
      determine that the first set of one or more initial access signals indicates that at least the first TRP is associated with a first availability level, wherein the first set of one or more initial access signals is a subset of signals associated with a second availability level;
      send an echo signal to at least the first TRP, wherein one or more transmission parameters of the echo signal are derived from the first set of one or more initial access signals received from at least the first TRP; and
      receive a second set of one or more initial access signals after transmitting the echo signal, the second set of one or more initial access signals comprising information associated with accessing at least the first TRP.

12. The WTRU of claim 11, wherein the one or more transmission parameters of the echo signal are further derived by amplifying the first set of one or more initial access signals and using the amplified first set of one or more initial access signals as the echo signal, wherein the echo signal is derived without performing baseband processing on the first set of one or more initial access signals.

13. The WTRU of claim 11, wherein the one or more transmission parameters of the echo signal derived from the first set of one or more initial access signals comprise a beamforming an angle of departure, wherein the angle of departure is determined based on an estimated angle of arrival of the first set of one or more initial access signals.

14. The WTRU of claim 11, wherein the first set of one or more initial access signals indicate power class information for at least the first TRP, and the WTRU determines a power level for transmitting the echo signal based on the power class information.

15. The WTRU of claim 11, wherein the processor is further configured to determine one or more of a system bandwidth, a system numerology, a control signal bandwidth, a control signal frequency allocation, or a numerology of at least the first TRP based on the second set of one or more initial access signals.

16. The WTRU of claim 11, wherein the first set of one or more initial access signals is transmitted in accordance with one or more of a lower power level, a longer periodicity, a larger frequency raster, or a shorter beamforming sequence than that of the second set of one or more initial access signals.

17. The method of claim 1, further comprising transmitting a second echo signal requesting that at least the first TRP transitions to the second availability level if the first availability level of the at least first TRP is determined to be insufficient after sending the echo signal, wherein the echo signal is a first echo signal.

18. The WTRU of claim 11, wherein the processor is further configured to transmit a second echo signal requesting that at least the first TRP transitions to the second availability level if the first availability level of the at least first TRP is determined to be insufficient after sending the echo signal, wherein the echo signal is a first echo signal.

19. The method of claim 1, wherein the first availability level is associated with a first set of signals and the second availability level is associated with a second set of signals, wherein a number of signals in the first set of signals is less than a number of signals in the second set of signals.

20. The WTRU of claim 11, wherein the first availability level is associated with a first set of signals and the second availability level is associated with a second set of signals, wherein a number of signals in the first set of signals is less than a number of signals in the second set of signals.

* * * * *